United States Patent [19]

Ito

[11] Patent Number: 5,923,485
[45] Date of Patent: Jul. 13, 1999

[54] STORAGE DEVICE FOR RELIABLY MAINTAINING DATA IN A REPRODUCIBLE STATE FOR A LONG PERIOD OF TIME

[75] Inventor: Kenya Ito, Hachioji, Japan

[73] Assignee: Hitachi, Ltd., Tokyo, Japan

[21] Appl. No.: 08/811,570

[22] Filed: Mar. 5, 1997

[30] Foreign Application Priority Data

Mar. 8, 1996 [JP] Japan .................................. 8-051320

[51] Int. Cl.$^6$ .................................................. G11B 27/36
[52] U.S. Cl. .................................. 360/31; 360/53; 360/54
[58] Field of Search ........................... 360/54, 53, 73.03, 360/77.02, 78.04, 31, 15; 369/53, 84, 60; 707/204; 324/212, 226; 711/161, 162, 118

[56] References Cited

U.S. PATENT DOCUMENTS

| | | |
|---|---|---|
| 4,672,483 | 6/1987 | Kawada . |
| 4,881,136 | 11/1989 | Shiraishi et al. ...................... 360/31 X |
| 5,347,517 | 9/1994 | Satomura et al. ..................... 360/51 X |

OTHER PUBLICATIONS

Transistor Technology Special, "The Whole Technique for Utilizing Hard Disks and SCSI", pp. 6–8, CQ Publishing Company.
P. Lu et al, "Magnetic Viscosity in High–Density Recording", Jounal Of Applied Physics, vol. 75, No. 10, May 15, 1994, pp. 5768–5770.
P. Lu et al, "Thermal Instability at 10 Gbit/in Magnetic Recording", IEEE Transactions On Magnetics, vol. 30, No. 6, Nov. 1994, pp. 4230–4232.
M. Igarashi et al, "Coercivity Reduction in Thin Film Media by Thermal Fluctuation", Technical Report Of The Institute Of Electronics, Information And Communication Engineers, MR94–105, Mar. 1995, pp. 25–30.

W. Cain et al, "Challenges in the Practical Implementation of Perpendicular Magnetic Recording", IEEE Transactions On Magnetics, vol. 32, No. 1, Jan. 1996, pp. 97–102.

Dataquest Alert, Apr. 17, 1995, pp. 1–2.

Transistor Technology Special, "The Whole Technique for Utilizing Hard Disks and SCSI", CQ Publishing Company, May 1, 1991, pp. 6–8.

*Primary Examiner*—Alan Faber
*Attorney, Agent, or Firm*—Fay, Sharpe, Beall, Fagan, Minnich & McKee

[57] ABSTRACT

A time counting device, a cache memory and a copy control circuit are added to a conventional disk drive so that recorded information is copied periodically and automatically. Alternatively, a cache memory, a copy control circuit, a reference control circuit, a first time counting device and a second time counting device are added to the conventional disk drive so that information which remains recorded for a predetermined period of time after its last recording date is automatically copied. According to another embodiment, a reference signal is recorded in advance and a reproduced output is periodically measured. If the reproduced output is lower than a reference value, recorded information is automatically copied. According to yet another embodiment, the temperature in the disk drive is measured by a thermometer 18, and if the temperature is higher than a reference value, information is automatically copied at shorter intervals than when the temperature is less than the reference value. Other embodiments are also disclosed with the aim of ensuring that information recorded on a magnetic media can always be reproduced reliably, even in the case of high density recording.

10 Claims, 11 Drawing Sheets

STORAGE DEVICE FOR RELIABLY MAINTAINING DATA IN A REPRODUCIBLE STATE FOR A LONG PERIOD OF TIME

FIELD OF THE INVENTION

The present invention relates to a method for maintaining the reliability of a storage device and, more particularly, to a storage device capable of holding high-density recorded information in a semi-permanently reproducible state.

BACKGROUND OF THE INVENTION

An example of a disk drive control system known in the art is illustrated in FIG. 5 along with a portion of the control system of a host computer. In FIG. 5, reference numeral 25 denotes a control circuit system of the disk drive, and reference numeral 21 denotes part of the control system of the host computer. This disk drive control system 25 includes an interface section 4, a read/write control section 5, a head position control section 6, and a spindle motor control section 7. The interface section 4 is connected to the read/write control section 5, the head position control section 6, the spindle motor control section 7, and a disk drive interface section 11 in the host computer 21. In addition, the read/write control section 5, the head position control section 6 and the spindle motor control section 7 are respectively connected to a read/write head 8, a head carriage 9 and a spindle motor 10. An instruction from the host computer 21 is sent to the interface section 4 of the disk drive control system 25 through the disk drive interface section 11 in the host computer 21, so that reading/writing of information is performed. When reading/writing is performed, a disk is rotated by the spindle motor 10. Then, the read/write head 8 is moved to a desired track by head carriage 9 so that the formation and detection of recorded magnetization can be performed by the read/write head 8. These operations are respectively controlled by the spindle motor control section 7, the head position control section 6 and the read/write control section 5. A disk drive having the above-described type of arrangement is disclosed in, for example, "Transistor Technology Special, The whole Technique for Utilizing Hard Disks and SCSI, p. 8 (CQ Publishing Company).

Once information is recorded in a conventional disk drive, the information is not copied as long as a person does not give the disk drive a specific instruction to copy. This is because magnetic recording has been considered to be a recording method that is capable of semi-permanently holding information recorded once, in the form of recorded magnetization.

However, if magnetic particles are reduced in size or a medium is made from a thin film in order to increase the recording density of magnetic recording, the recorded magnetization of each bit will weaken with time, due to influences such as from thermal fluctuation. It has been discovered that this phenomenon is particularly serious at high temperatures. This is disclosed in the Journal of Applied Physics 75 (10) (May 1994), IEEE Transactions on Magnetics, Vol. 30, No. 6, (1994), and the Technical Report of the Institute of Electronics, Information and Communication Engineers of Japan, MR94-105, pp. 25–30 (March, 1995)" and so on.

In IEEE Transactions on Magnetics, Vol. 32, No. 1, (Jan. 1996), it is reported that in the case of a medium using a soft magnetic under layer, the reproduced output may decrease with time. A decrease in recorded magnetization leads to the problem that the reliability of the storage device is impaired because information cannot be correctly reproduced.

The process of conducting a self-diagnosis and predicting trouble (SMART) has been proposed as a means for maintaining or improving the reliability of a disk drive. According to this process, a warning is issued to a host if the number of seek errors or retries during normal use exceeds a reference value. This process is disclosed in DATAQUEST ALERT (Apr. 17, 1995). However, in this method, since no warning is issued until an abnormality occurs during normal use, there is a risk that it will be too late to securely restore data when recorded magnetization of the medium has become small.

SUMMARY OF THE PRESENT INVENTION

It is an object of the present invention is to solve the above-described problems of the prior art and hold high-density recorded information in a semi-permanently reproducible state, thereby maintaining the reliability of storage devices.

To achieve this object, a storage device according to the present invention has at least one recording medium, a medium driving section for driving the recording medium, a read/write head for reading/writing information from/to the recording medium, a head positioning section for driving the read/write head, and a control system for processing a recording signal to be sent to a write head and a reproduced signal sent from a read head, and for processing a control signal for the medium driving section and the head positioning section. The storage device additionally includes a time counting device, a cache memory and a copy control circuit, and periodically and automatically copies information recorded in the storage device.

More specifically, in the embodiment shown in FIG. 1, a disk drive includes at least an interface section 4, a read/write control section 5, a head position control section 6 and a spindle motor control section 7, each of which is connected to the interface section 4, a read/write head 8 connected to the read/write control section 5, a head carriage 9 connected to the head position control section 6, and a spindle motor 10 connected to the spindle motor control section 7. The storage device additionally includes a first timing counting device 1, a cache memory 2 and a copy control circuit 3, the copy control circuit 3 is connected to each of the timing counting device 1, the cache memory 2, the interface section 4, the read/write control section 5, the head position control section 6 and the spindle motor control section 7, and the disk drive periodically transmits from the timing counting device 1 a signal for actuating the copy control circuit 3, sequentially reproducing information previously recorded in the disk drive, temporarily storing the information in the cache memory 2, and again automatically recording the information into the disk, i.e. performing copying.

A storage device according to the present invention includes at least one recording medium, a medium driving section for driving the recording medium, a read/write head for reading/writing information from/to the recording medium, a head positioning section for driving the read/write head, and a control system for processing a recording signal to be sent to a write head and a reproduced signal sent from a read head, and for processing a control signal for the medium driving section and the head positioning section. The storage device additionally includes a time counting device, a cache memory, a copy control circuit and a reference control circuit, and has a function to automatically copy information which remains recorded for a predetermined time after the last recording date on which arbitrary information has been recorded, from the information previously recorded in the storage device.

Specifically, in the embodiment shown in FIG. 2, a disk drive at least comprises an interface section 4, a read/write control section 5, a head position control section 6, a spindle motor control section 7, each of the three sections 5, 6 and 7 being connected to the interface section 4, a read/write head 8 connected to the read/write control section 5, a head carriage 9 connected to the head position control section 6, and a spindle motor 10 connected to the spindle motor control section 7. The storage device additionally includes a cache memory 2, a copy control circuit 3, a reference control circuit 12, a first time counting device 13 and a second time counting device 14, the copy control circuit 3 is connected to each of the cache memory 2, the interface section 4, the read/write control section 5, the head position control section 6, the spindle motor control section 7 and the reference control circuit 12, the reference control circuit 12 is connected to each of the interface section 4, the read/write control section 5, the head position control section 6, the spindle motor control section 7, the first time counting device 13 and the second time counting device 14, the storage device has a function to periodically transmit a signal for actuating the reference control circuit 12 from the first time counting device 13, search for information which remains recorded for a predetermined time or more after the last recording date, in the information previously recorded in the disk drive, while making reference to the present year, month and day outputted from the second time counting device 14, transfer the name of the information to the copy control circuit 3, sequentially reproduce the corresponding information, temporarily store the information in the cache memory 2 and thereafter again automatically record the stored information in the disk drive, i.e. performing copying. A storage device according to the present invention includes at least one recording medium, a medium driving section for driving the recording medium, a read/write head for reading/ writing information from/to the recording medium, a head positioning section for driving the read/write head, and a control system for processing a recording signal to be sent to a write head and a reproduced signal sent from a read head, and for processing a control signal for the medium driving section and the head positioning section. The storage device additionally includes a time counting device, a cache memory, a copy control circuit and a reproduced output detect circuit, and records a predetermined signal in part of the storage device in advance, periodically measures the reproduced output of the signal and, if the reproduced output is smaller than a predetermined reference value, again record the signal, and automatically copying information recorded in the storage device. Specifically, in the embodiment shown in FIG. 3, a disk drive at least comprises an interface section 4, a read/write control section 5, a head position control section 6, a spindle motor control section 7, each of the three sections 5, 6 and 7 being connected to the interface section 4, a read/write head 8 connected to the read/write control section 5, a head carriage 9 connected to the head position control section 6, and a spindle motor 10 connected to the spindle motor control section 7. The storage device additionally includes a cache memory 2, a copy control circuit 3, a time counting device 13 and a reproduced output detect circuit 17, the copy control circuit 3 is connected to each of the cache memory 2, the interface section 4, the read/write control section 5, the head position control section 6, the spindle motor control section 7 and the reproduced output detect circuit 17, the reproduced output detect circuit 17 is connected to each of the read/write control section 5, the head position control section 6, the spindle motor control section 7 and the time counting device 13, and has a function to record a predetermined reference signal in part of the disk drive in advance, periodically transmit from the first time counting device 13 a signal for actuating the reproduced output detect circuit 17, measure the reproduced output of the reference signal, and, if the reproduced output is smaller than a predetermined reference value, transmit from the reproduced output detect circuit 17 a signal for actuating the copy control circuit 3, again record the reference signal, and automatically copying information recorded in the disk device 23.

Any of the above storage devices according to the present invention also have a function to automatically copy information recorded in the storage device to the storage device or to another storage device if the temperature in the storage device is higher than a predetermined reference value. These storage devices further include a thermometer and a time counting device, and has a function to automatically copy the information recorded in the storage device to the storage device or to another storage device at intervals of period shorter than that during normal temperature if the temperature in the storage device is higher than the predetermined reference value.

For example, in the embodiment shown in FIG. 4 in which this method is added to the embodiment shown in FIG. 1, a disk drive at least comprises an interface section 4, a read/write control section 5, a head position control section 6, a spindle motor control section 7, each of the three sections 5, 6 and 7 being connected to the interface section 4, a read/write head 8 connected to the read/write control section 5, a head carriage 9 connected to the head position control section 6, and a spindle motor 10 connected to the spindle motor control section 7, and is characterized in that the storage device additionally comprises a first timing counting device 1, a cache memory 2, a copy control circuit 3, a thermometer 18 and a second time counting device 19, the copy control circuit 3 is connected to each of the first timing counting device 1, the cache memory 2, the interface section 4, the read/write control section 5, the head position control section 6, the spindle motor control section 7, the thermometer 18 and the second time counting device 19, the disk drive has, in addition to the function to periodically and automatically copy information, a function to measure the temperature in the disk drive with the thermometer 18 at all times during the operation of the disk drive and, if the temperature is higher than a predetermined reference value, transmit from the thermometer 18 a signal for actuating the second time counting device 19, transmit from the second time counting device 19 a signal for actuating the copy control circuit 3 at intervals of period shorter than that during normal temperature, and automatically copy information recorded in the disk device to the disk drive or another disk drive.

These and other objects, features and advantages of the present invention will become more apparent in view of the following detailed description of the preferred embodiments in conjunction with the drawings.

BRIEF DESCRIPTION OF THE DRAWINGS

FIG. 6(a) is a plan view and FIG. 6(b) is a cross-sectional view taken along line 6b—6b of FIG. 6(a).

DETAILED DESCRIPTION OF THE PREFERRED EMBODIMENTS

Embodiments of a storage device to which the present invention is applied will be described below in more detail with reference to the accompanying drawings.

Figure 1:
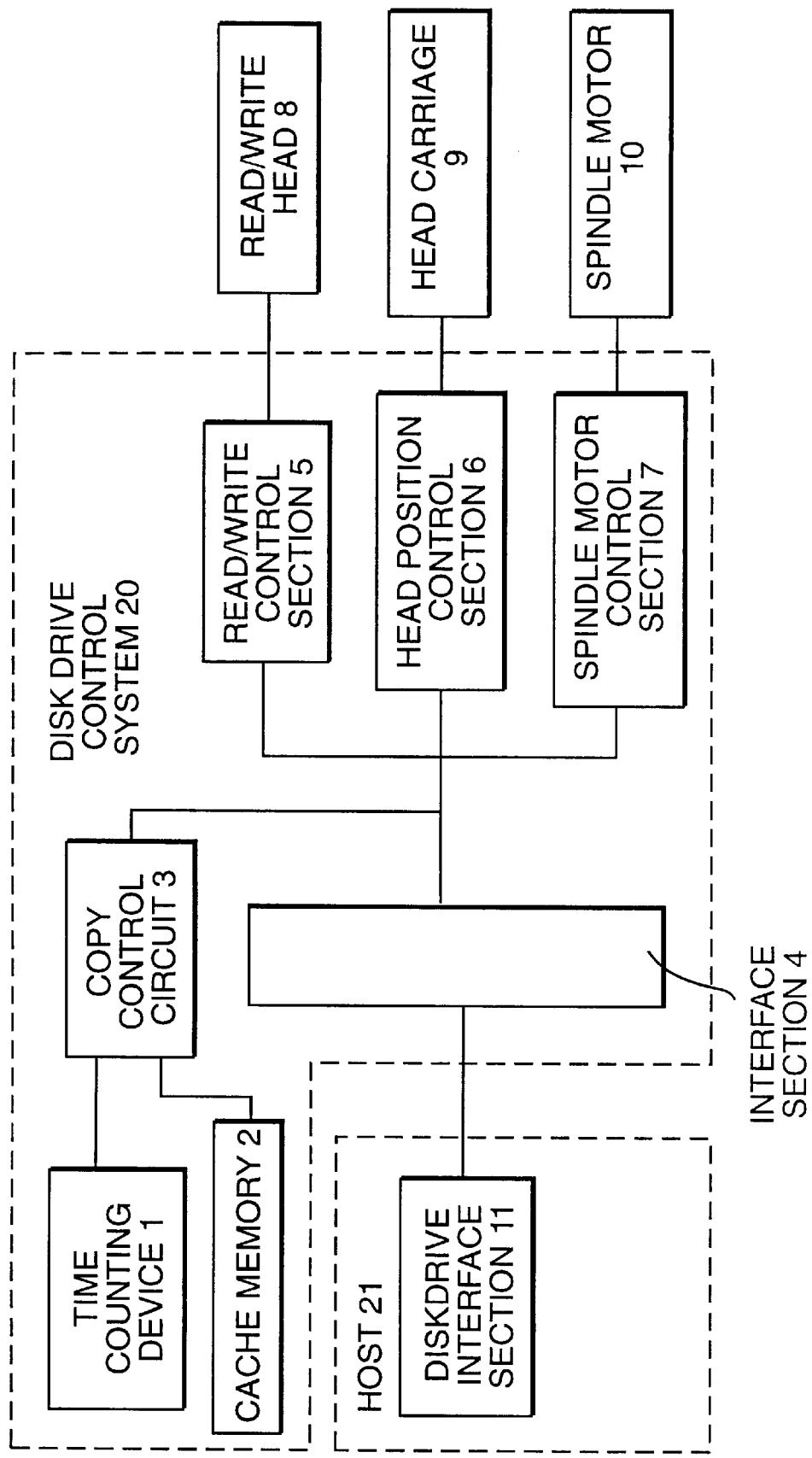
FIG. 1 is a block diagram showing one embodiment of a storage device control system according to the present invention.

FIG. 1 is a view showing a disk drive control system according to one embodiment of the present invention. In FIG. 1, reference numeral 20 denotes a disk drive control system. This disk drive control system 20 includes a time counting device 1, a cache memory 2, a copy control circuit 3, an interface section 4, a read/write control section 5, a head position control section 6, and a spindle motor control section 7. The copy control circuit 3 is connected to each of the timing counting device 1, the cache memory 2, the interface section 4, the read/write control section 5, the head position control section 6 and the spindle motor control section 7. The interface section 4 is connected to each of the read/write control section 5, the head position control section 6 and the spindle motor control section 7. The read/write control section 5, the head position control section 6 and the spindle motor control section 7 are respectively connected to a read/write head 8, a head carriage 9 and a spindle motor 10.

Normally, a read/write operation is carried out in a manner similar to the conventional example. First, a disk is rotated by the spindle motor 10, then the read/write head 8 is moved to a desired track by the head carriage 9, and then the formation and detection of recorded magnetization are performed by the read/write head 8. These operations are respectively controlled by the spindle motor control section 7, the head position control section 6 and the read/write control section 5.

In addition to the above-described normal operations, each time one year elapses after the present disk drive is manufactured, it sequentially reproduces all existing files, temporarily stores the reproduced information in the cache memory 2, and again records that information into the same area on the disk. The timing counting device 1 is actuated when the present disk drive is manufactured, and each time one year elapses, the timing counting device 1 transmits a signal for actuating the copy control circuit 3, to automatically perform the above-described operation. It should be noted that while one year has been set as the time period, other time periods can be selected while being within the scope of the present invention.

Figure 3:
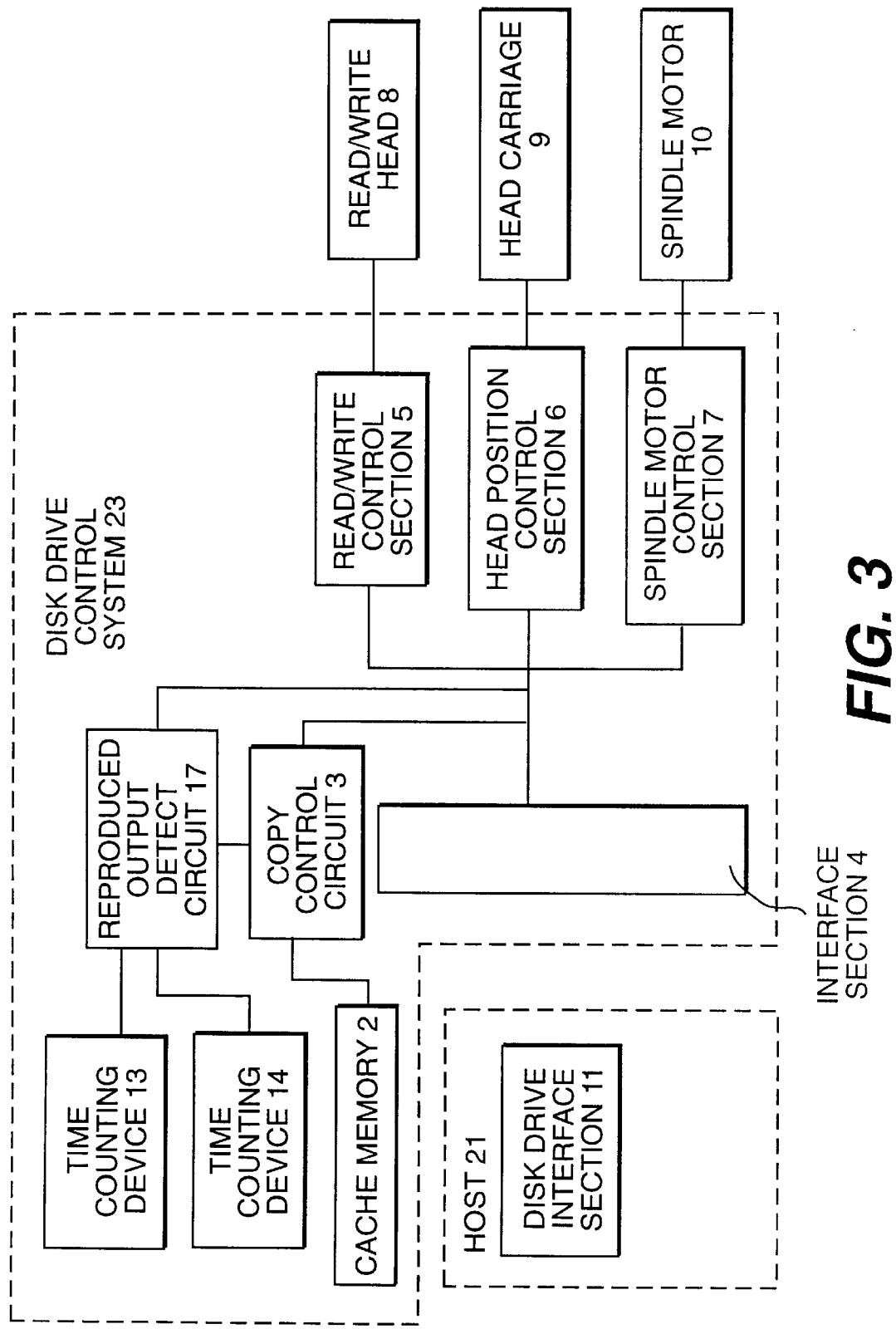
FIG. 3 is a block diagram showing a third embodiment of the storage device control system according to the present invention.

The present embodiment differs from the conventional example shown in FIG. 3 in that the arrangement of the present embodiment is such that the timing counting device 1, the cache memory 2 and the copy control circuit 3 are added to the conventional disk drive control system, and the present embodiment has a function to periodically transmit from the timing counting device 1 a signal for actuating the copy control circuit 3, sequentially reproducing information previously recorded in the disk drive, temporarily storing the information in the cache memory 2, and again automatically recording the information into the disk, that is, a function to perform copying. Incidentally, the timing counting device and the cache memory 2 may be similar to existing types, and the copy control circuit 3 may consist of only a section which is required to control copying in an existing disk controller. Further description of some of the elements is provided later in the description.

Figure 6A:
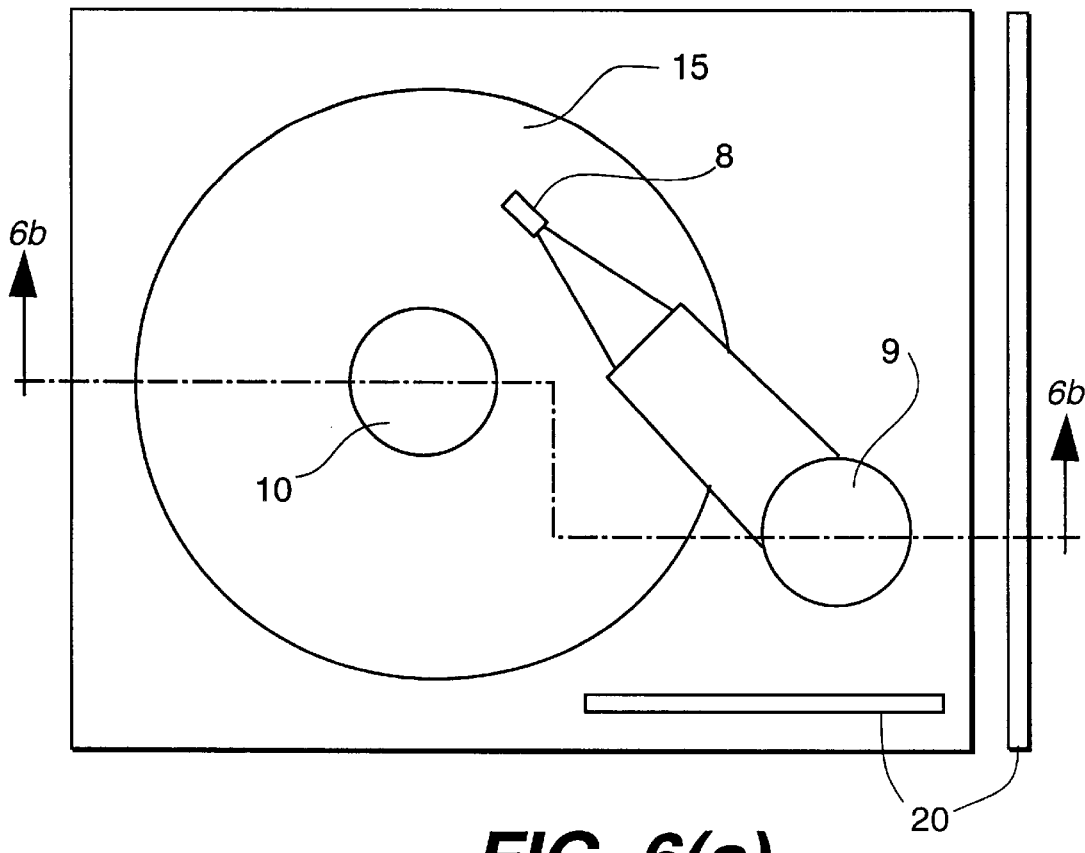
FIGS. 6(a) and 6(b) are schematic arrangement views showing one embodiment of a disk drive provided with the storage device control system according to the present invention.
Figure 6B:
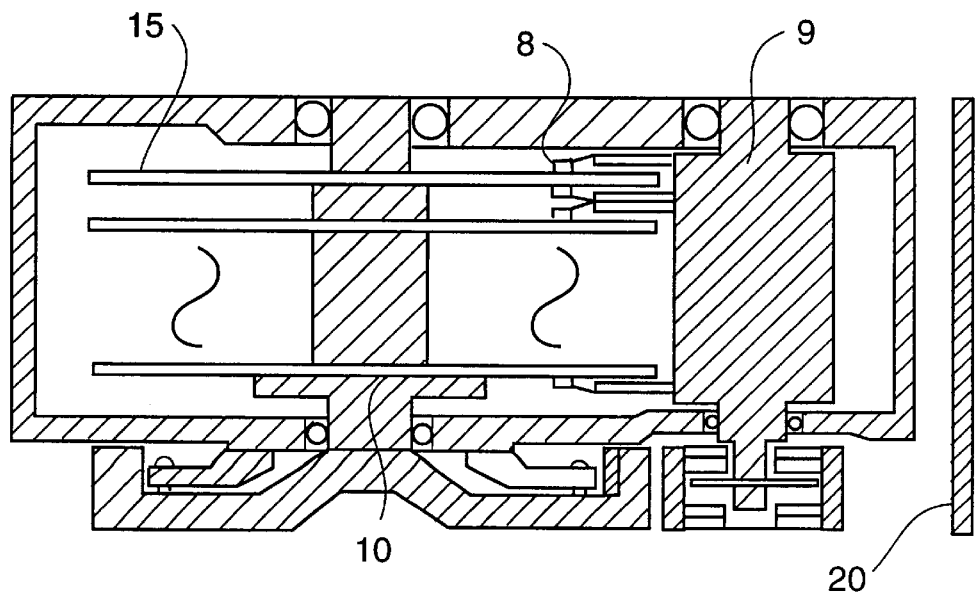

One example of the disk drive provided with the disk drive control system 20 of the present embodiment will be described below with reference to FIGS. 6(a) and 6(b). FIGS. 6(a) and 6(b) are schematic arrangement views of one embodiment of the disk drive according to the present invention, where FIG. 6(a) is a plan view and FIG. 6(b) is a cross-sectional view taken along line 6b—6b of FIG. 6(a). In these Figures, reference numeral 15 denotes a recording medium, for example a disk which uses Co sputtered medium, reference numeral 10 denotes a spindle motor which rotationally drives the recording medium 15, reference numeral 8 denotes a read/write head for reading/writing a signal from/to the recording medium, reference numeral 9 denotes a head carriage, which is called a rotary actuator, for moving the read/write head 8 above the recording medium in the radial direction thereof, and reference numeral 20 denotes a disk drive control system. A plurality of recording media are secured to the spindle motor 10, and the read/write heads 8 are respectively provided on both sides of each of the recording media.

The PRML method is used for reproduced waveform signal processing in this disk drive, and a servo track positioning method is used for positioning the read/write head 8. The magnetic characteristics of the recording medium 15 which uses a Co sputtered medium are such that the product of the remnant magnetization by the magnetic film thickness is 70 Gauss·μm and its circumferential coercivity is 3,000 Oe, and the rotational speed of the spindle motor is 7,200 rpm. The read/write head 8 uses an inductive head as a write head and a magneto-resistive head as a read head. The track width and the gap length of the write head are 1.3 μm and 0.4 μm, respectively. The track width and the gap length of the read head are 1.1 μm and 0.2 μm, respectively. The recording density is 5 Gbits/in$^2$.

Figure 7:
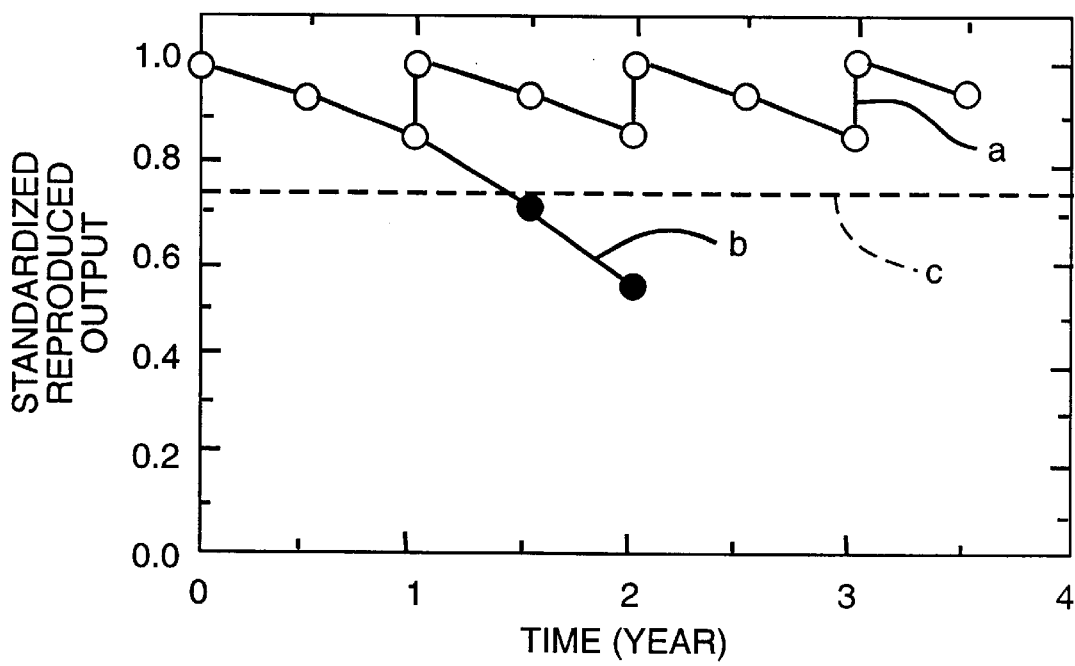
FIG. 7 is a characteristic graph showing the dependence of the standardized reproduced output on the elapsed time at normal temperature, for comparison of the characteristic of the disk drive provided with the storage device control system according to the present invention shown in FIG. 1 with the characteristic of a conventional example. Characteristic line "a" shows the results obtained by carrying out measurement of one example of the disk drive control system according to the present invention and characteristic line "b" shows the results obtained by carrying out measurement of the conventional example. Dashed line "c" shows the minimum reproduced output value required of the disk drive.

In FIG. 7, line "a" shows the results obtained by measuring the dependence of standardized reproduced output on the elapsed time at normal temperature during the use of the disk driving arranged in this manner. Line "a" is obtained by measuring the reproduced output immediately after a signal is recorded into the disk drive of the present embodiment, subsequently leaving the disk drive alone with no operation conducted by the host side, again measuring the reproduced output on a later day, and comparing this reproduced output with the value measured immediately after the recording. FIG. 7 further shows a characteristic graph "b" of a conventional disk drive. A dashed line "c" shows the minimum reproduced output value required of the disk drive to be used as a product. As can be seen from FIG. 7, the reproduced output of the conventional disk drive becomes lower with the passage of time and, one and a half year later, falls below the minimum value required of the disk drive to be used as a product. On the other hand, the disk drive of the present embodiment keeps its reproduced output higher than in the conventional example, thereby improving reliability.

Although, in the present embodiment, information is re-recorded at intervals of period of one year, the period may be determined to be a different value according to the specifications of the read/write system and to the magnetic characteristics and the thermal stability of the disk. Although, in the present embodiment, information is copied to the same location where the information has been recorded, such information may be copied to a different location in the same disk drive or to another storage device. In addition, while the above-described periodical automatic copy operation is being performed, a message to the effect that "periodical automatic copying is being executed" may be sent to the host side.

Alternatively, the above-described automatic copy function may be added to the host computer.

Figure 2:
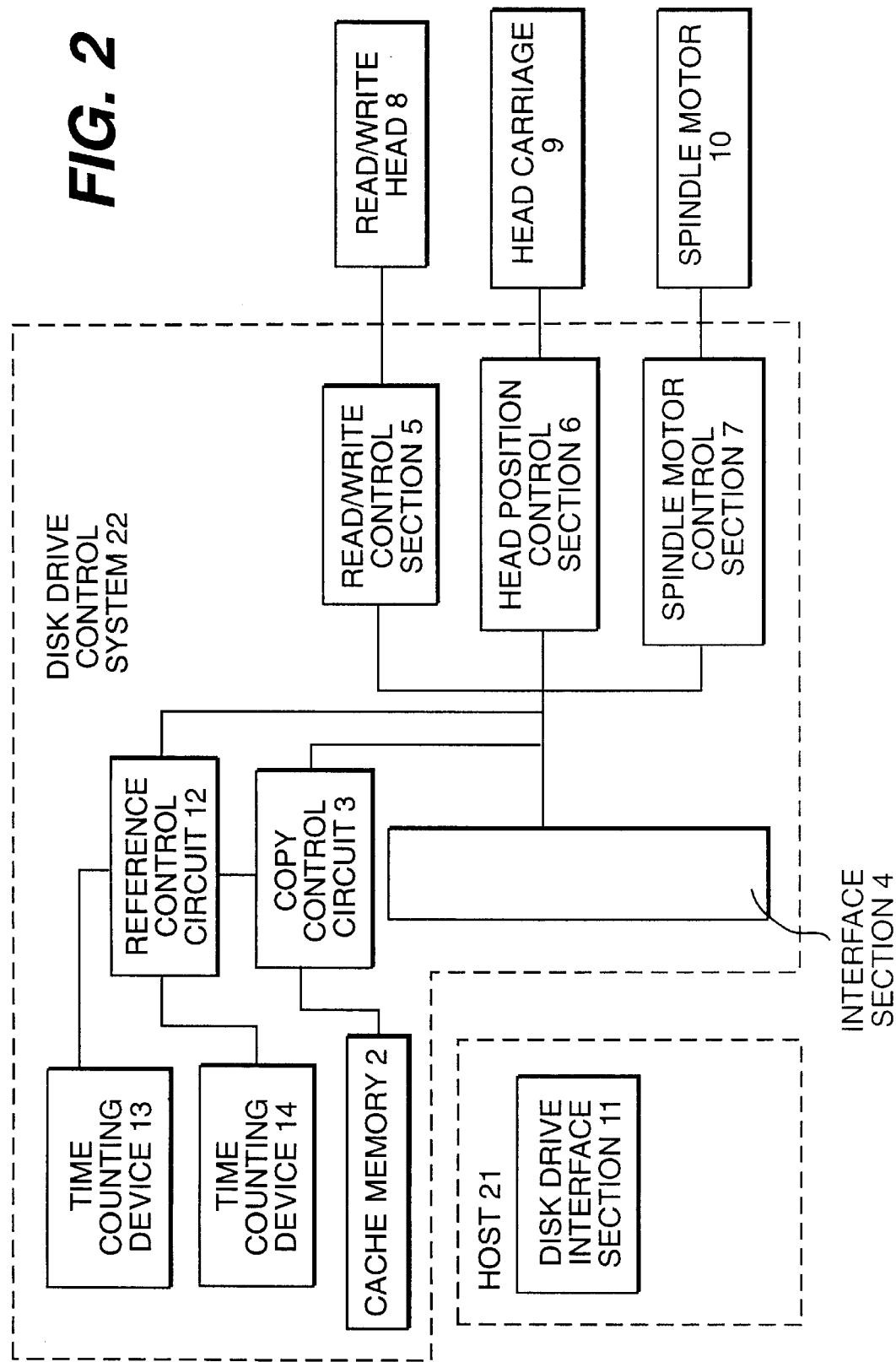
FIG. 2 is a block diagram showing a second embodiment of the storage device control system according to the present invention.

FIG. 2 is a schematic block diagram of a second embodiment of a disk drive control system according to the present invention. In FIG. 2, reference numeral 22 denotes a disk drive control system. In FIG. 2, identical reference numerals are used to denote constituent sections identical to those shown in FIG. 1, and the detailed description thereof will be omitted in order to be more concise. Specifically, the disk drive control system of the present embodiment includes a conventional disk drive control system to which a cache memory 2 and a copy control circuit 3 are added, and also includes a reference control circuit 12, a first time counting device 13 and a second time counting device 14. The copy control circuit 3 is connected to each of the cache memory 2, the interface section 4, the read/write control section 5, the head position control section 6, the spindle motor control section 7 and the reference control circuit 12. The reference control circuit 12 is connected to each of the interface section 4, the read/write control section 5, the head position control section 6, the spindle motor control section 7, the first time counting device 13 and the second time counting device 14. The arrangement of the second embodiment differs from that of the first embodiment in that the first time counting device 13 transmits a signal for actuating the reference control circuit 12, at intervals of 30 days. Also, information which was recorded one year or more ago is searched for, using the present year, month and day outputted from the second time counting device 14 as a reference. The identification of such information which is found is transferred to the copy control circuit 3 and the corresponding information is sequentially reproduced. The information is stored temporarily in cache memory 2 before being copied and again stored in the same area on the disk. The cache memory 2, the first time counting device 13 and the second time counting device 14 which are additionally provided may be the same as existing ones, and the copy control circuit 3 and the reference control circuit 12 may consist of only sections which are required to control their respective functions in an existing disk controller.

The dependence of the standardized reproduced output with respect to time, at normal temperature, was measured with the control system 22 of the present embodiment employed in place of the disk drive control system 20 used in the disk drive shown in FIG. 6. The results of the measurement are equivalent to those of Embodiment 1 shown in FIG. 7. It can be understood, therefore, that the disk drive having the arrangement of the present embodiment is also affective in maintaining a high reliability.

Although, in the present embodiment, the last recording date of the existing file is checked at intervals of period of 30 days and the time in which it is judged that information needs to be again recorded is one year, these periods may be set to different values according to the specifications of the read/write system and the magnetic characteristics and thermal stability of a disk. Although, in the present embodiment, information is copied to the same location where the information has been recorded, such information may be copied to a different location in the same disk drive or to another storage device. In addition, while the above-described periodical automatic copy operation is being performed, a message to the effect that "periodical automatic copying is being executed" may be sent to the host side.

Alternatively, the above-described automatic copy function may be added to the host computer.

FIG. 3 is a schematic block diagram of a third embodiment of the control system of the disk drive according to the present invention. In FIG. 3, reference numeral 23 denotes a disk drive control system. Identical reference numerals are used to denote portions identical to those of Embodiment 1 shown in FIG. 1, and a detailed description thereof will be omitted for conciseness. Specifically, the disk drive control system of the present embodiment includes a conventional disk drive control system to which a cache memory 2 and a copy control circuit 3 are added, and also includes a time counting device 13 and a reproduced output detect circuit 17. The copy control circuit 3 is connected to each of the cache memory 2, an interface section 4, a read/write control section 5, a head position control section 6, a spindle motor control section 7 and the reproduced output detect circuit 17. The reproduced output detect circuit 17 is connected to each of the read/write control section 5, the head position control section 6, the spindle motor control section 7 and the time counting device 13. The arrangement of embodiment 3 differs from that of embodiment 1 in that a predetermined reference signal is recorded in part of the disk device in advance, and the time counting device 13 transmits a signal for actuating the reproduced output detect circuit 17, at intervals of 30 days, and the reproduced output detect circuit 17 measures the reproduced output of the reference signal and, if the measured value of the reproduced output is smaller than the predetermined reference value, transmits a signal for actuating the copy control circuit 3. In the present embodiment, a value equal to 0.85 times the standardized reproduced output is set as the reference value. After the copy control circuit 3 is actuated, the reference signal is again recorded, and information recorded in the disk drive is sequentially reproduced and temporarily stored in the cache memory 2, and the information is again recorded into the same area on the disk. The cache memory 2 and the time counting device 13 may be similar to existing ones, and the copy control circuit 3 and the reproduced output detect circuit 17 may consist of only sections which are required to control their respective functions in an existing disk controller or in the read/write control section. Details of various components are discussed further herein by way of example.

The dependence of the standardized reproduced output on the elapsed time at normal temperature was measured with the control system 23 of the present embodiment being employed in place of the disk drive control system 20 used in the disk drive shown in FIG. 6. The results of the measurement are equivalent to those of Embodiment 1 shown in FIG. 7. It can be understood, therefore, that the disk drive having the arrangement of the present embodiment is also effective in maintaining high reliability.

Although, in the present embodiment, the reproduced output of the reference signal is checked at intervals of period of 30 days and the reference value of the reproduced output is equivalent to 0.85 times the standardized reproduced output, these periods may be set to different values according to the specifications of the read/write system and the magnetic characteristics and thermal stability of the disk. In addition, each time the disk drive is actuated, the operation of checking the reproduced output of the reference signal may be performed. Furthermore, although information is copied to the same location where the information has been recorded, such information may be copied to a different location in the same disk drive or to another storage device. In addition, while the above-described periodical automatic copy operation is being performed, a message to the effect that "periodical automatic copying is being executed" may be sent to the host side.

Alternatively, the above-described automatic copy function may be added to the host computer.

Figure 4:
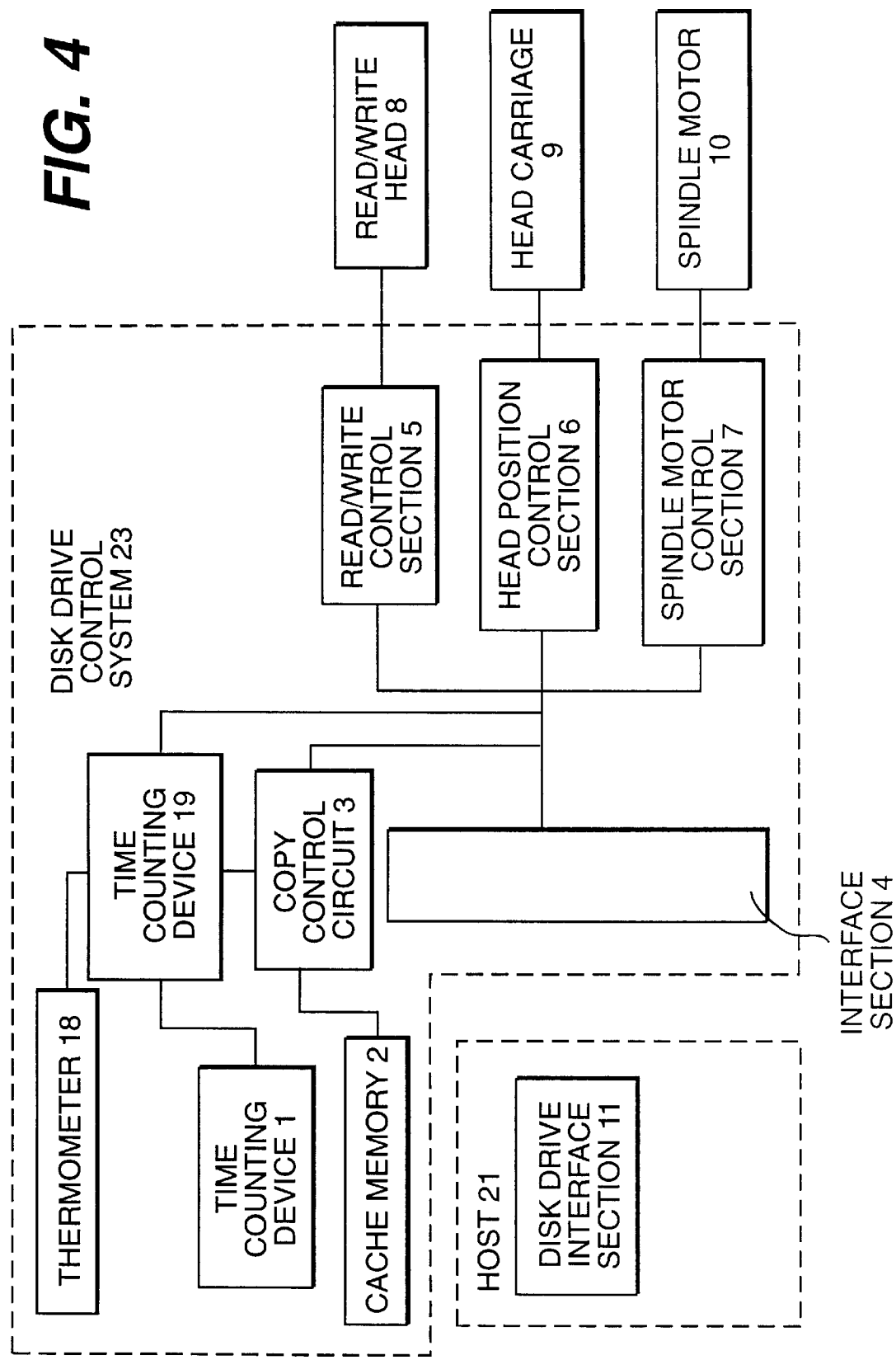
FIG. 4 is a block diagram showing a fourth embodiment of the storage device control system according to the present invention.
Figure 5:
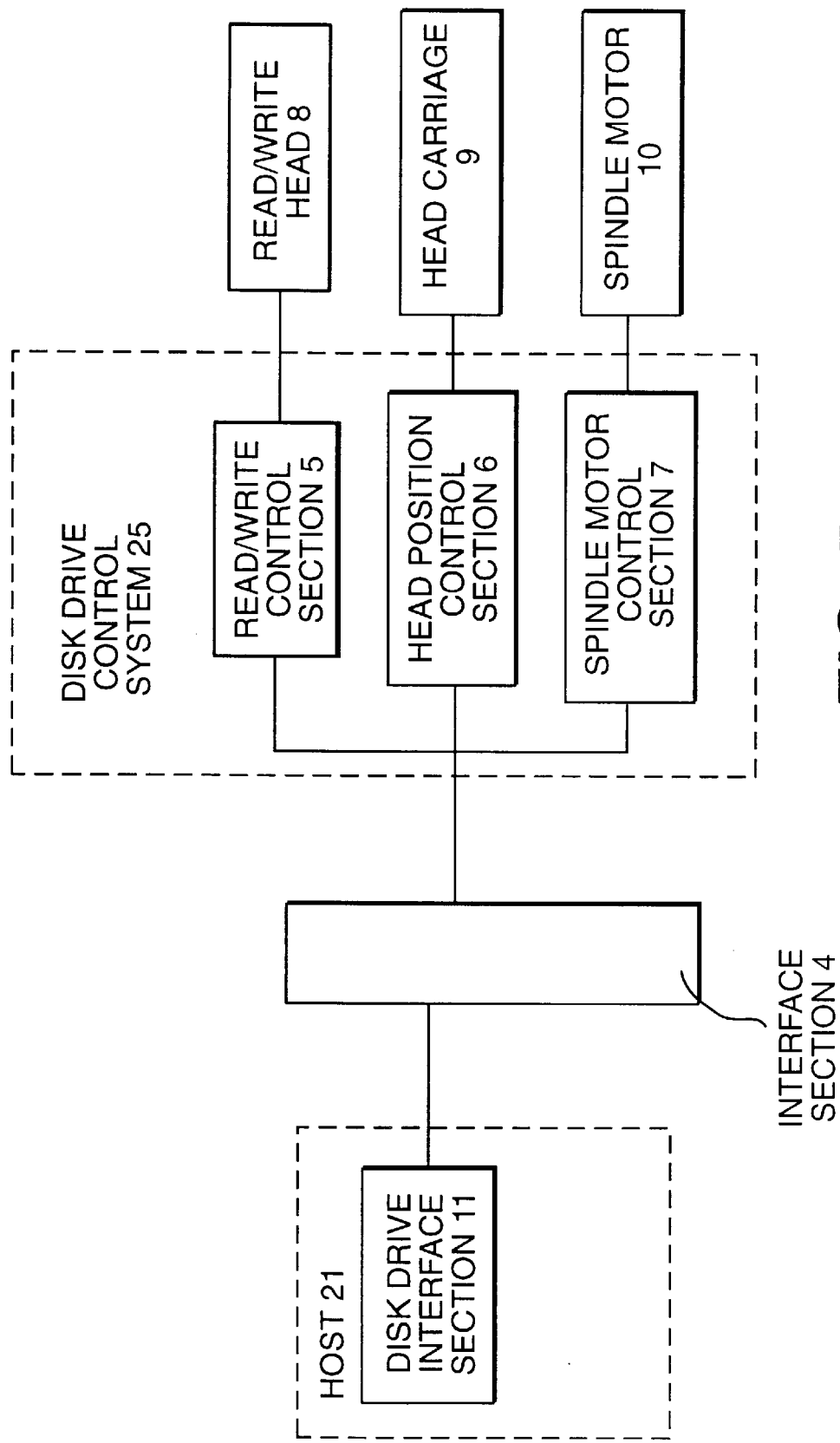
FIG. 5 is a block diagram showing an example of a conventional storage device control system.

FIG. 4 is a schematic block diagram of a fourth embodiment of the disk drive control system according to the present invention. In FIG. 4, reference numeral 24 denotes a disk drive control system. Identical reference numerals are used to denote portions identical to those of Embodiment 1 shown in FIG. 1, and the detailed description thereof will be omitted for conciseness. Specifically, the disk drive control system of the present embodiment includes a conventional disk drive control system to which a first timing counting device 1, a cache memory 2 and a copy control circuit 3 are added, and also includes a thermometer 18 and a second time counting device 19. The copy control circuit 3 is connected to each of a first timing counting device 1, the cache memory 2, a interface section 4, a read/write control section 5, a head position control section 6, a spindle motor control section 7 and the second time counting device 19. The thermometer 18 is connected to the second time counting device 19. The disk drive control system according to this embodiment periodically and automatically performs copying of information, as described previously in connection with the first embodiment, but differs from the first embodiment in that the thermometer 18 measures the temperature in the disk drive during the operation of the disk drive at all times and, if the temperature is higher than 60° C., transmits a signal for actuating the second time counting device 19. The second time counting device 19, after being actuated, transmits a signal for actuating the copy control circuit 3, at intervals of six months, thereby automatically copying information recorded in the disk drive to the same or a different disk drive. After the copy control circuit 3 is actuated, the information recorded in the disk drive in sequentially reproduced and temporarily stored in the cache memory 2, and the information is again recorded. Incidentally, the first timing counting device 1, the cache memory 2, the thermometer 18 and the second time counting device 19 may be of existing types, and the copy control circuit 3 may consist of only the sections which are required to control the copy function in an existing disk controller.

Figure 8:
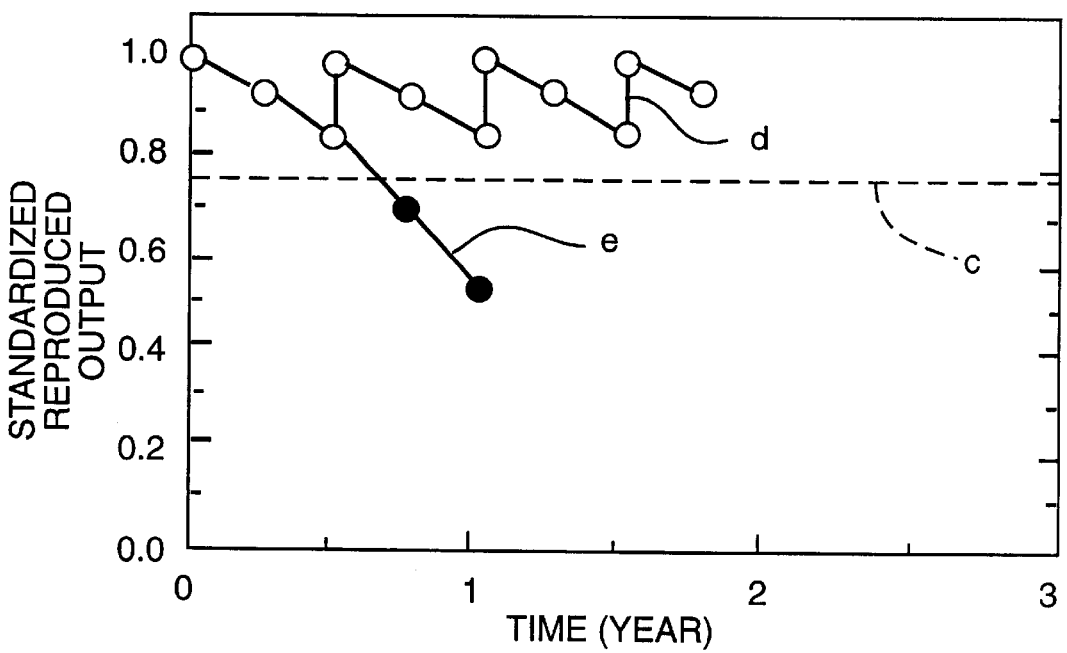
FIG. 8 is a characteristic graph showing the dependence of standardized reproduced output on the elapsed time in a 60° C. atmosphere, for comparison of the characteristic of the disk drive provided with the storage device control system according to the present invention shown in FIG. 4 with the characteristic of a conventional example. Characteristic line "d" shows the results obtained by carrying out measurement of one example of the disk drive control system according to the present invention and characteristic line "e" shows the results obtained by carrying out measurement the conventional example. Dashed line "c" shows the minimum reproduced output value required of the disk drive.

The dependence of the standardized reproduced output with respect to time, at normal temperature, was measured with the control system 24 of the present embodiment employed in place of the disk drive control system 20 used in the disk drive shown in FIG. 6. The results of the measurement are equivalent to that for the first embodiment 1, shown in FIG. 7. In addition, a similar measurement was separately conducted in an atmosphere having a temperature of 60° C. A characteristic graph "d" which represents the results of this measurement is shown in FIG. 8. FIG. 8 further shows a characteristic graph "e" of a conventional disk drive. The dashed line "c" shows the minimum reproduced output value required of the disk drive to be used as a product. As can be seen from FIG. 8, the reproduced output of the conventional disk drive becomes lower with the passage of time and, one year later, falls below the minimum value required of the disk drive to be used as a product. On the other hand, the disk drive of the present embodiment keeps its reproduced output higher than that of the conventional disk drive.

It can be understood, therefore, that the disk drive having the arrangement of the present embodiment is also effective in maintaining a high reliability at a high temperature of approximately 60° C.

In the present embodiment, the temperature at which the thermometer 18 transmits a signal for actuating the second time counting device 19 is set to 60° C. and the second time counting device 19 transmits a signal for actuating the copy control circuit 3, at intervals having a period of 6 months. However, the period may be set to a different value according to the specifications of the read/write system and to the magnetic characteristics and thermal stability of the disk. In addition, although, in the present embodiment, the thermometer 18 and the second time counting device 19 are added to the first embodiment, they may also be added to either of the second and third embodiments. Furthermore, although information is copied to the same location where the information has been recorded, such information may be copied to a different location in the same disk drive or to another storage device. In addition, while the above-described periodical automatic copy operation is being performed, a message to the effect that "periodical automatic copying is being executed" may be sent to the host side.

Alternatively, the above-described automatic copy function may be added to the host computer.

FIGS. 9–16 are more detailed examples of various components added by the present invention to the conventional device. These detailed examples are provided as additional disclosure only and are not to be construed as the only implementations of these components. Of course, minor, insignificant variations can be made and still be within the scope of the present invention.

Figure 9:
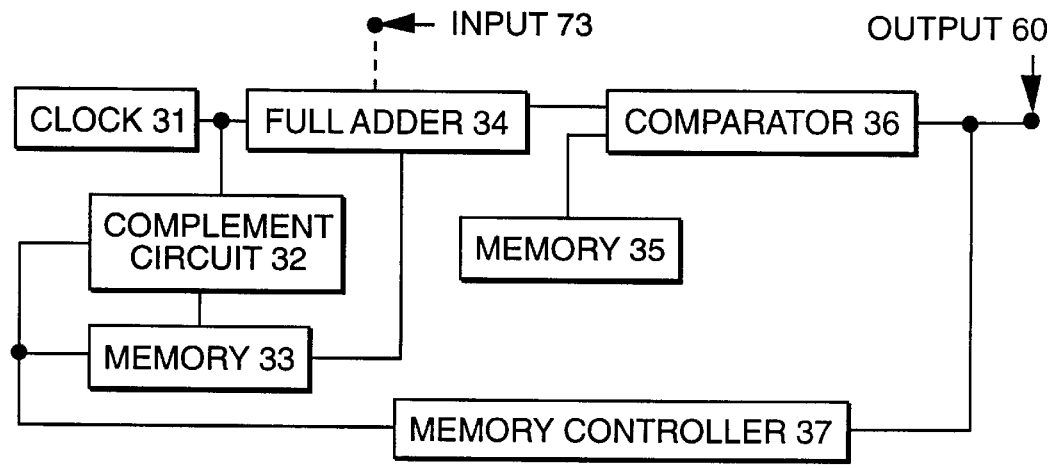
FIG. 9 illustrates an example of a time counting device of the present invention.

FIG. 9 illustrates a time counting device 1. The last date when copy control circuit 3 was used is recorded in memory 33. Complement circuit 32 is provided when this information is stored in binary. A predetermined time period, such as one year, is recorded as a threshold for causing copy control circuit 3 to start, and is stored in memory 35. The result calculated in full adder 34 is compared with that stored in memory 35 in comparator 36. If more than a year has passed since the last day the copy control circuit 3 was at work, comparator 36 puts out a signal, output 60, to make the copy control circuit 3 start, and memory controller 37 makes memory 33 record the present date as an expression in the binary scale. For the fourth embodiment discussed above, input 73 is connected with thermometer 18.

Figure 10:
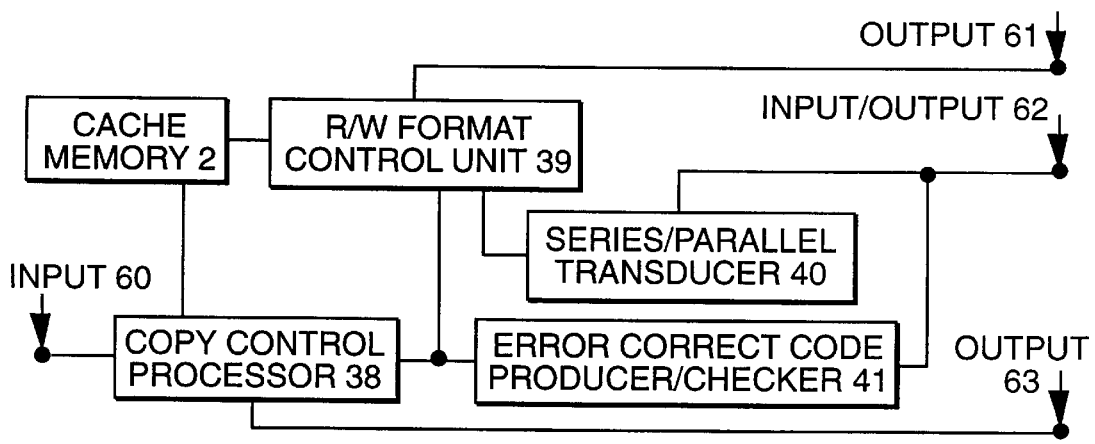
FIG. 10 illustrates an example of a cache memory and a copy control circuit of the present invention.

FIG. 10 illustrates a cache memory 2 and copy control circuit 3. Copy control processor 38 puts out a signal to copy the information recorded in storage device by way of R/W format control unit 39, series/parallel transducer 40 and error correct code producer/checker 41. Output 61 and output 62 are connected with Read/Write control section 5. Output 63 is connected with both head position control section 6 and spindle motor control section 7. R/W format control unit 39, series/parallel transducer 40 and error correct code producer/checker 41 are shown in "Transistor Technology Special, The Whole Technique for Utilizing Hard Disks and SCSI", pg. 8 (CQ Publishing Company). When the information recorded in the storage device is forwarded, cache memory 2 is used as temporary storage.

Figure 11:
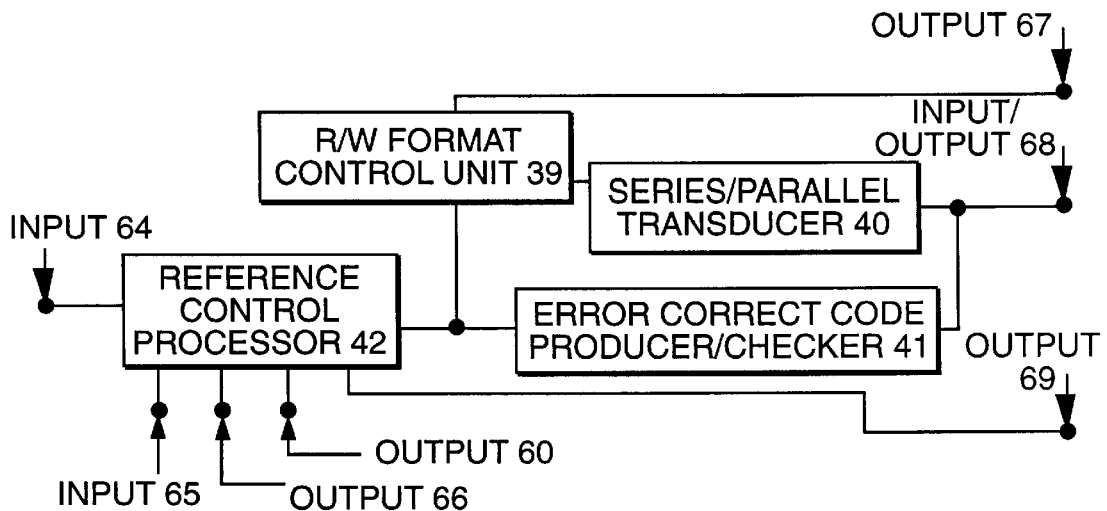
FIG. 11 illustrates an example of a reference control circuit of the present invention.

FIG. 11 illustrates reference control circuit 12. Reference control processor 42 puts out a signal to refer to the last date when each information was written in storage device by way of R/W format control unit 39, series/parallel transducer 40 and error correct code producer/checker 41. Output 67 and output 68 are connected with Read/Write control section 5. Output 69 is connected with both head position control section 6 and spindle motor control section 7. Input 64 is connected with time counting device 13. The signal to start reference control processor is received from time counting device 13. Input 65 and output 66 are connected with the time counting device 14. The information of the last date when each information was written in storage device is sent from output 66 to time counting device 14. The signal whether more than one year has passed since the last day the information was written or not comes from time counting device 14 to input 65. Output 60 is connected with copy control circuit 2. If more than one year has passed since the last day the information was written, the signal to start copy control circuit is sent from output 60.

Figure 12:
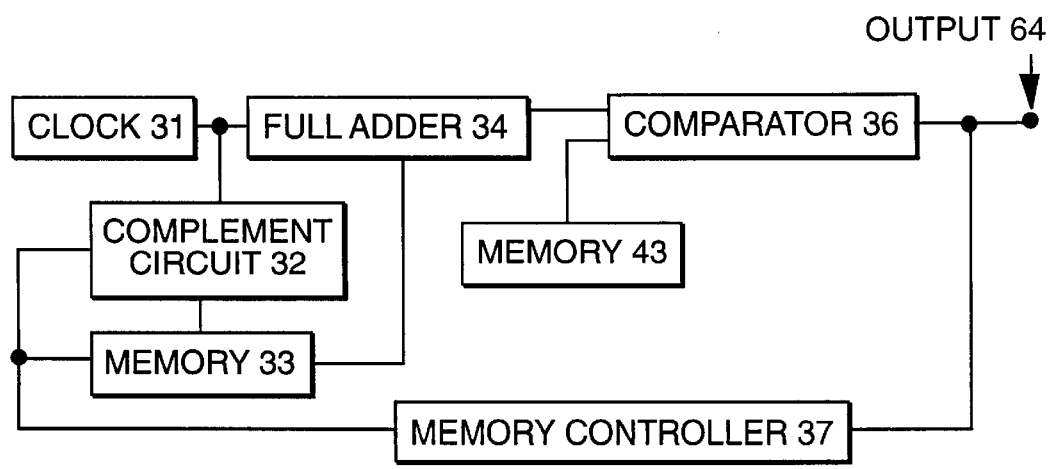
FIG. 12 illustrates another example of a time counting device of the present invention.

FIG. 12 illustrates a time counting device 13. Time counting device 13 is the same as time counting device 1 except the information recorded in memory 43 and except that output 64 is connected with either reference control circuit 12 or reproduced output detect circuit 17. In memory 43, a time period equal to 30 days is recorded, for example.

Figure 13:
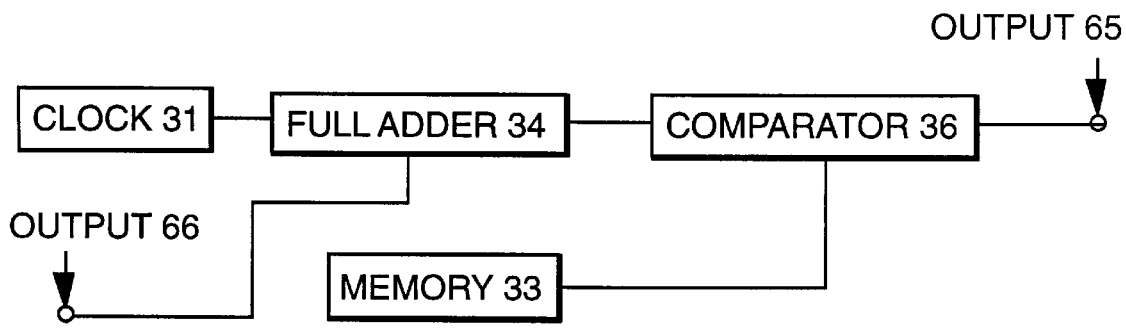
FIG. 13 illustrates yet another example of a time counting device of the present invention.

FIG. 13 illustrates a time counting device 14. Output 65 and input 66 are connected with reference control circuit 12. The last date when the information recorded in storage device was written is sent from reference control circuit 12 to input 66. The time difference between this date and the present date shown by clock 31 is calculated in full adder 34. The time period, one year, is previously recorded in memory 33 as a threshold beyond which copy control circuit 3 is started. The result calculated in full adder 34 is compared with memory 33 in comparator 36. If more than a year has passed since the last day when the information was written in storage device, the signal to make the information copied is sent from output 65 by way of reference control circuit 12 to copy control circuit 3.

Figure 14:
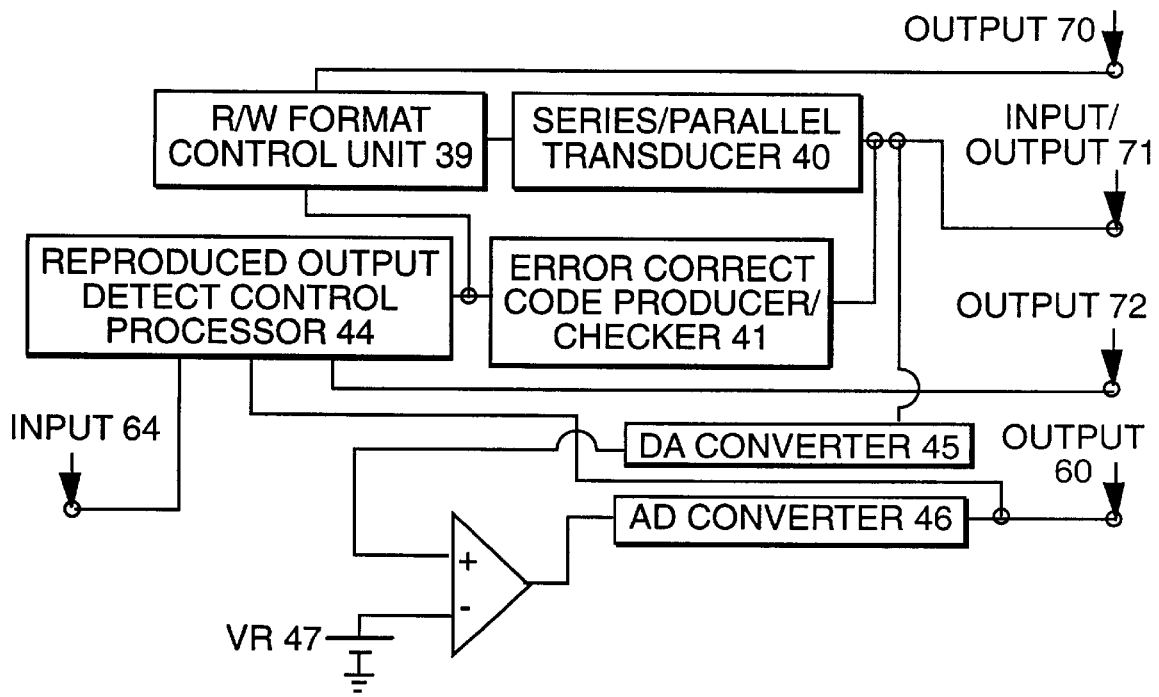
FIG. 14 illustrates an example of a reproduced output detect circuit of the present invention.

FIG. 14 illustrates a reproduced output detect circuit 17. Reproduced output detect control processor 44 puts out a signal to detect the voltage of the reproduced output of the information recorded for detection in a storage device by way of R/W format control unit 39, series/parallel transducer 40 and error correct code producer/checker 41. Output 70 and output 71 are connected with Read/Write control section 5. Output 72 is connected with both head position control section 6 and spindle motor control section 7. The voltage (Vr) is set to be equal to 0.85 times the voltage of the standardized reproduced output as a threshold for starting the copy control circuit 3. The reproduced output is sent by way of DA converter 45 to analog comparator and is compared with the voltage Vr. Output 60 is connected with copy control circuit 3. If the reproduced output is lower than Vr, reproduced output detect control processor 44 outputs a signal to rewrite the information recorded for detection in a storage device, and puts out the signal from output 60 to make copy control circuit 3 started.

Figure 15:
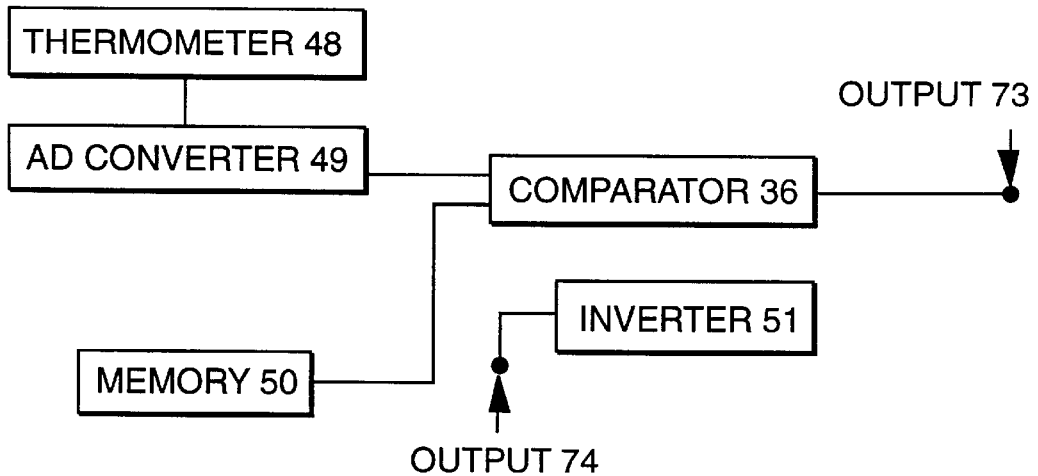
FIG. 15 illustrates an example of a thermometer employed according to the present invention.

FIG. 15 illustrates a thermometer 18. The value of 60 degrees centigrade is previously recorded in memory 50 as a threshold past with the copy control circuit 3 is started. The value of temperature that is measured by thermometer 48 is compared with memory 50 in comparator 36. Outputs 73 and 74 are connected with time counting devices 1 and 19, respectively. If the temperature is lower than 60 degrees centigrade, time counting device 1 is started and time counting device 19 is stopped. If the temperature is higher than 60 degrees centigrade, time counting device 1 is stopped and time counting device 19 is started.

Figure 16:
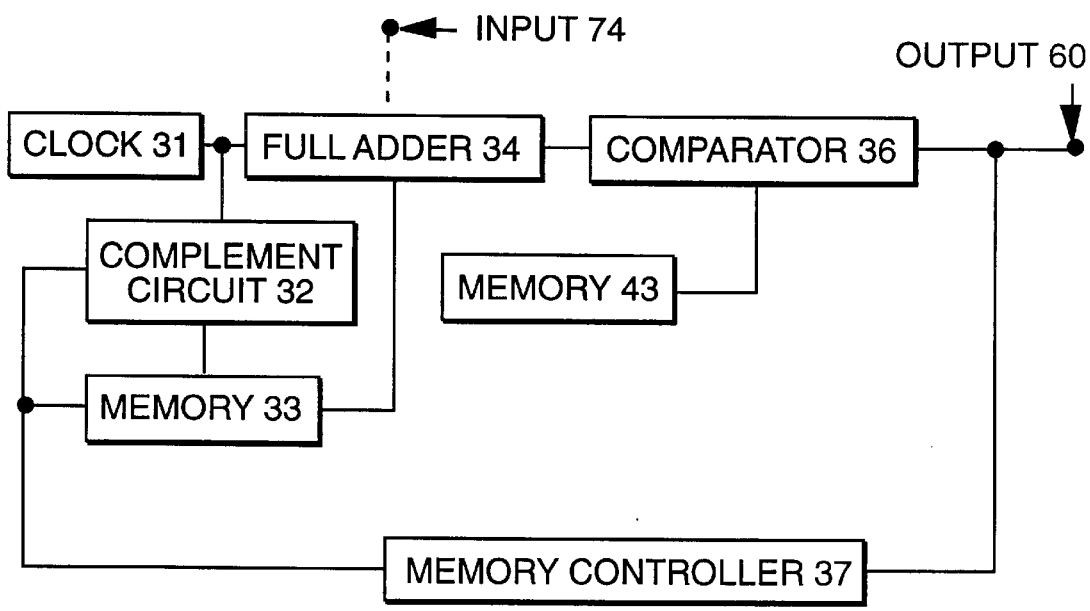
FIG. 16 illustrates another example of a time counting device of the present invention.

FIG. 16 illustrates time counting device 19. Time counting device 19 is as same as time counting device 1 except for the information recorded in memory 52. In memory 52, information corresponding to a time period of 6 months is recorded. Input 74 is connected with thermometer 18. Output 60 is connected with copy control circuit 3.

According to the present invention, information recorded in a recording medium is again recorded before the recorded magnetization formed in the recording medium decreases to a value at which the recorded information becomes difficult to reproduce without error. This way, information recorded at high density can be held in a semi-permanently reproducible state and the reliability of the storage device can be maintained.

While the present invention has been described above in connection with the preferred embodiments, one of ordinary skill in the art would be enabled by this description to make various modifications and still be within the scope and spirit of the present invention as recited in the appended claims.

What is claimed is:

1. A storage device for updating information stored on a storage medium comprising:
   a read/write head;
   a read/write control section connected to the read/write head, the read/write control section controlling the reading/writing of data from the recording medium by the read/write head; and a reproduced output detection circuit connected to the read/write control section, the reproduced output detection circuit periodically measuring specific information previously recorded on the storage medium, and wherein if the specific information has a strength below a predetermined threshold level, the read/write control section is operated to cause the read/write head to read data from the recording medium and write the data back to the same location of the recording medium where the data has been recorded.

2. A storage device according to claim 1, further comprising a cache memory for temporarily storing data to be written to the recording medium.

3. A storage device for ensuring reliable storage of information contained in a storage medium comprising:

read/write means for reading/writing data from/to the storage medium; and disk drive control means for controlling the read/write means, wherein the disk drive control means include means for periodically reproducing and measuring the strength of a prerecorded signal from the storage medium and instructing the read/write means to copy identical information onto the same location of the storage medium where the data has been recorded when the strength of the prerecorded signal is below a predetermined threshold.

4. A storage device according to claim 3, wherein the identical information is copied onto the storage medium by first reading the information from the storage medium and writing the information back to the storage medium.

5. A storage device according to claim 4, further comprising a cache memory for temporarily storing data read from the storage medium.

6. A storage device for updating information stored on a storage medium comprising:

a read/write head;

a head carriage for moving the read/write head;

a spindle motor for driving the recording medium;

a read/write control section connected to the read/write head, the read/write control section controlling the reading/writing of data from the recording medium by the read/write head;

a head position control section connected to the head carriage and causing movement of the read/write head; and a spindle motor control section connected to the spindle motor and causing the spindle motor to drive the recording medium;

a reproduced output detection circuit connected to the read/write control section, the head position control section and the spindle motor control section, the reproduced output detection circuit periodically measuring specific information previously recorded on the storage medium, and wherein if the specific information has a strength below a predetermined threshold level, the read/write control section is operated to cause the read/write head to read data from the recording medium and write the data back to the same location of the recording medium where the data has been recorded.

7. A storage device according to claim 6, further comprising a cache memory for temporarily storing data to be written to the recording medium.

8. A storage device for ensuring reliable storage of information contained in a storage medium comprising:

read/write means for reading/writing data from/to the storage medium;

head carriage means for moving the read/write means;

spindle motor means for driving the storage medium; and disk drive control means for controlling the read/write means, the head carriage means and the spindle motor means, wherein the disk drive control means include means for periodically reproducing and measuring the strength of a prerecorded signal from the storage medium and instructing the read/write means to copy identical information onto the same location of the storage medium where the data has been recorded when the strength of the prerecorded signal is below a predetermined threshold.

9. A storage device according to claim 8, wherein the identical information is copied onto the storage medium by first reading the information from the storage medium and writing the information back to the storage medium.

10. A storage device according to claim 9, further comprising a cache memory for temporarily storing data read from the storage medium.

* * * * *